(12) United States Patent
Zhou (10) Patent No.: US 10,776,623 B2
(45) Date of Patent: Sep. 15, 2020

(54) METHOD FOR ELECTRONIC DEVICE ACQUIRING IRIS AND ELECTRONIC DEVICE

(71) Applicant: GUANGDONG OPPO MOBILE TELECOMMUNICATIONS CORP., LTD., Dongguan, Guangdong (CN)

(72) Inventor: Yibao Zhou, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/006,624

(22) Filed: Jun. 12, 2018

(65) Prior Publication Data
US 2018/0373930 A1 Dec. 27, 2018

(30) Foreign Application Priority Data
Jun. 26, 2017 (CN) .......................... 2017 1 0494299

(51) Int. Cl.
*G06K 9/00* (2006.01)
*G06K 9/20* (2006.01)
(Continued)

(52) U.S. Cl.
CPC ....... *G06K 9/00604* (2013.01); *G06K 9/2018* (2013.01); *G06K 9/2027* (2013.01);
(Continued)

(58) Field of Classification Search
None
See application file for complete search history.

(56) References Cited

U.S. PATENT DOCUMENTS 5,293,535 A * 3/1994 Sensui .................. G03B 13/06
396/384
7,568,802 B2 * 8/2009 Phinney ............. G06K 9/00604
351/221
(Continued)

FOREIGN PATENT DOCUMENTS

CN    201927050 U    8/2011
CN    202210263 U    5/2012
(Continued)

OTHER PUBLICATIONS

European Patent Application No. 18177769.9 extended Search and Opinion dated Nov. 26, 2018, 7 pages.
(Continued)

*Primary Examiner* — Tracy Y. Yi
*Assistant Examiner* — Shanika M Brumfield
(74) *Attorney, Agent, or Firm* — Lathrop GPM LLP (57) ABSTRACT

An iris acquisition method for an electronic device is provided. The electronic device includes an iris camera and a proximity sensor. The proximity sensor includes an infrared ray emitter and an infrared ray receiver. The iris acquisition method includes: emitting a proximity infrared ray for detecting a proximity state by the infrared ray emitter; receiving the proximity infrared ray reflected from an external object by the infrared ray receiver; and upon the reception of the reflected proximity infrared ray by the infrared ray receiver, changing a transmitting power of the infrared ray emitter, so that the iris camera acquires iris information of an user.

17 Claims, 7 Drawing Sheets

(51) Int. Cl.
*G06T 7/521* (2017.01)
*G06T 7/73* (2017.01)
*H04N 5/247* (2006.01)
*H04N 5/33* (2006.01)

(52) U.S. Cl.
CPC ............... *G06T 7/521* (2017.01); *G06T 7/73* (2017.01); *H04N 5/247* (2013.01); *H04N 5/33* (2013.01); *G06T 2207/10048* (2013.01); *G06T 2207/10152* (2013.01)

(56) References Cited

U.S. PATENT DOCUMENTS

| | | | | |
|---|---|---|---|---|
| 9,870,506 B2* | 1/2018 | Gousev | | G06K 9/00362 |
| 10,120,992 B2* | 11/2018 | Shim | | G06K 9/22 |
| 2004/0160518 A1* | 8/2004 | Park | | G06K 9/00604 |
| | | | | 348/207.99 |
| 2010/0157139 A1* | 6/2010 | Velarde | | H04N 5/2354 |
| | | | | 348/366 |
| 2013/0047017 A1* | 2/2013 | Lin | | G06F 1/3287 |
| | | | | 713/323 |
| 2013/0135513 A1* | 5/2013 | Choi | | A61B 5/0077 |
| | | | | 348/335 |
| 2013/0293457 A1* | 11/2013 | Yoon | | G06F 3/011 |
| | | | | 345/156 |
| 2016/0150399 A1* | 5/2016 | Zhang | | H04W 8/22 |
| | | | | 455/418 |
| 2016/0274659 A1* | 9/2016 | Caraffi | | G06F 3/013 |
| 2016/0275348 A1* | 9/2016 | Slaby | | G06K 9/00604 |
| 2016/0283789 A1 | 9/2016 | Slaby et al. | | |
| 2016/0372631 A1* | 12/2016 | Hasegawa | | H01L 33/18 |

FOREIGN PATENT DOCUMENTS

| | | | | |
|---|---|---|---|---|
| CN | 105608436 A | | 5/2016 | |
| CN | 205213119 U | | 5/2016 | |
| CN | 105809139 A | | 7/2016 | |
| DE | 102016104528 A1 | | 9/2016 | |
| KR | 20130013711 A | | 2/2013 | |
| WO | WO-2016204924 A1 * | 12/2016 | | B67D 1/0882 |
| WO | WO 2016204924 A1 | 12/2016 | | |

OTHER PUBLICATIONS

Chinese Patent Application No. 201710494299.4, Office Action dated Jul. 29, 2019, 13 pages.
Chinese Patent Application No. 201710494299.4, English translation of Office Action dated Jul. 29, 2019, 15 pages.
European Patent Application No. 18177769.9, Office Action dated Jan. 16, 2020, 7 pages.
Chinese Patent Application No. 201710494299.4, Second Office Action dated May 7, 2020, 11 pages.
Chinese Patent Application No. 201710494299.4, English translation of Second Office Action dated May 7, 2020, 13 pages.

* cited by examiner

METHOD FOR ELECTRONIC DEVICE ACQUIRING IRIS AND ELECTRONIC DEVICE

CROSS-REFERENCE TO RELATED APPLICATION

The application claims priority to and benefits of Chinese Patent Application Serial No. 201710494299.4, filed with the State Intellectual Property Office of P. R. China on Jun. 26, 2017, the entire content of which is incorporated herein by reference.

FIELD

The present disclosure relates to a technical field of consumer electronic apparatuses, and particularly to an iris acquisition method and an electronic device.

BACKGROUND

When an iris recognition module performs iris recognition, an iris camera is always in an on state, resulting in comparatively high power consumption of an electronic device.

SUMMARY

Embodiments of the present disclosure provide an iris acquisition method and an electronic device.

The method according to embodiments of the present disclosure is for an electronic device acquiring an iris, including:

emitting a proximity infrared ray for detecting a proximity state by an infrared ray emitter, the electronic device including an iris camera and a proximity sensor, the proximity sensor including the infrared ray emitter and an infrared ray receiver;

receiving the proximity infrared ray reflected from an external object by the infrared ray receiver; and upon the reception of the reflected proximity infrared ray by the infrared ray receiver, changing a transmitting power of the infrared ray emitter, so that the iris camera acquires iris information of a user.

Another method for an electronic device acquiring an iris is provided. The method includes:

emitting a proximity infrared ray for detecting a proximity state by an infrared ray emitter, the electronic device including an iris camera and a proximity sensor, the proximity sensor including the infrared ray emitter and an infrared ray receiver;

receiving the proximity infrared ray reflected from an external object by the infrared ray receiver;

upon the reception of the reflected proximity infrared ray by the infrared ray receiver, emitting a ranging infrared ray by the infrared ray emitter;

receiving the ranging infrared ray reflected from the external object by a ranging receiver;

calculating a current acquisition distance between the iris camera and the external object according to a time difference between emitting of the ranging infrared ray and receiving of the reflected ranging infrared ray;

determining whether the current acquisition distance is in a preset distance range; and when the current acquisition distance is in the preset range, then changing a transmitting power of the infrared ray emitter, so that the iris camera acquires iris information of a user.

The electronic device according to embodiments of the present disclosure includes:

an iris camera for acquiring iris information;

a proximity sensor for detecting a proximity state between an external object and the electronic device, the proximity sensor including an infrared ray emitter and an infrared ray receiver, the infrared ray emitter emitting a proximity infrared ray for detecting the proximity state, the infrared ray receiver being used for receiving the infrared ray reflected from the external object;

upon the reception of the reflected infrared ray for detecting the proximity state by the infrared ray receiver, the infrared ray emitter changes a transmitting power, so that the iris camera acquires iris information of a user.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure will be described in detail herein, and examples of the embodiments are shown in the drawings. The same or similar elements and the elements having same or similar functions are denoted by like reference numerals throughout the descriptions. The embodiments described herein with reference to drawings are explanatory and used to generally understand the present disclosure. The embodiments shall not be construed to limit the present disclosure.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Embodiments of the present disclosure provide an iris acquisition method and an electronic device.

The method according to embodiments of the present disclosure is for an electronic device acquiring an iris, the method including:

emitting a proximity infrared ray for detecting a proximity state by an infrared ray emitter, the electronic device including an iris camera and a proximity sensor, the proximity sensor including the infrared ray emitter and an infrared ray receiver;

receiving the proximity infrared ray reflected from an external object by the infrared ray receiver; and upon the reception of the reflected proximity infrared ray by the infrared ray receiver, changing a transmitting power of the infrared ray emitter, so that the iris camera acquires iris information of a user.

Another method for an electronic device acquiring an iris is provided. The method includes:

emitting a proximity infrared ray for detecting a proximity state by an infrared ray emitter, the electronic device including an iris camera and a proximity sensor, the proximity sensor including the infrared ray emitter and an infrared ray receiver;

receiving the proximity infrared ray reflected from an external object by the infrared ray receiver;

upon the reception of the reflected proximity infrared ray by the infrared ray receiver, emitting a ranging infrared ray by the infrared ray emitter;

receiving the ranging infrared ray reflected from the external object by a ranging receiver;

calculating a current acquisition distance between the iris camera and the external object according to a time difference between emitting of the ranging infrared ray and receiving of the reflected ranging infrared ray;

determining whether the current acquisition distance is in a preset distance range; and when the current acquisition distance is in the preset range, then changing a transmitting power of the infrared ray emitter, so that the iris camera acquires iris information of a user.

The electronic device according to embodiments of the present disclosure includes:

an iris camera for acquiring iris information;

a proximity sensor for detecting a proximity state between an external object and the electronic device, the proximity sensor including an infrared ray emitter and an infrared ray receiver, the infrared ray emitter emitting a proximity infrared ray for detecting the proximity state, the infrared ray receiver being used for receiving the infrared ray reflected from the external object;

upon the reception of the reflected infrared ray for detecting the proximity state by the infrared ray receiver, the infrared ray emitter changes a transmitting power, so that the iris camera acquires iris information of a user.

Figure 1:
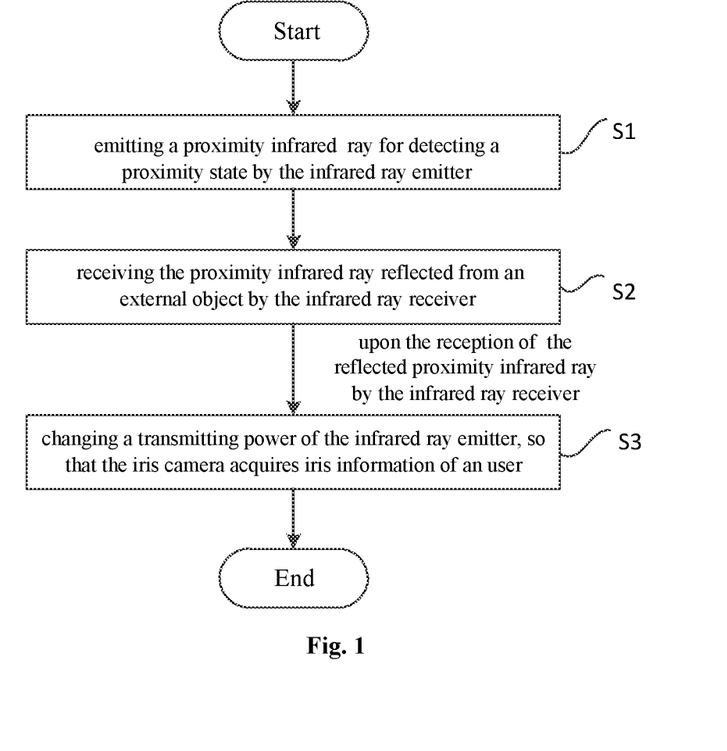
FIG. 1 is a flow chart of an iris acquisition method according to some embodiments of the present disclosure.
Figure 3:
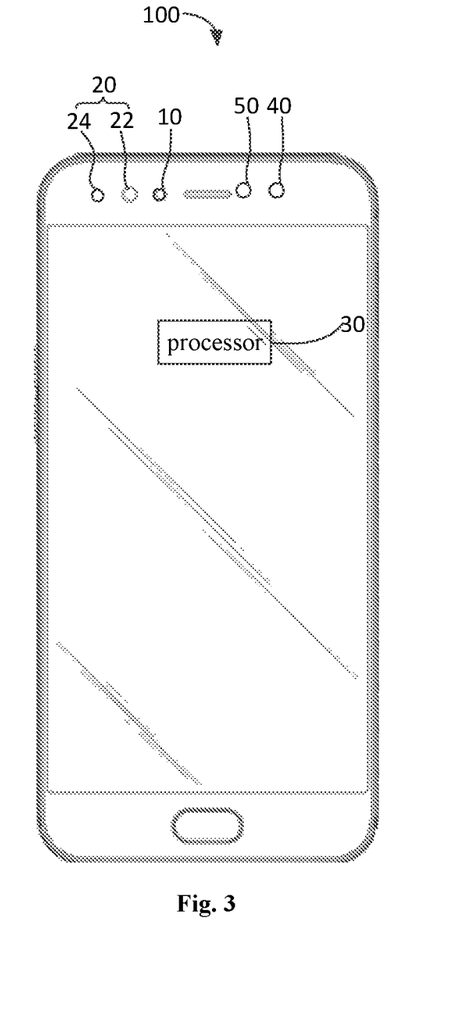
FIG. 3 is a plan schematic view of an electronic device according to some embodiments of the present disclosure.

Referring to FIGS. 1 and 3, an electronic device 100 of embodiments of the present disclosure includes an iris camera 10 and a proximity sensor 20. The proximity sensor 20 includes an infrared ray emitter 22 and an infrared ray receiver 24. The iris acquisition method includes:

S1: emitting a proximity infrared ray for detecting a proximity state by the infrared ray emitter 22;

S2: receiving the proximity infrared ray reflected from an external object by the infrared ray receiver 24; and S3: upon the reception of the reflected proximity infrared ray by the infrared ray receiver 24, changing a transmitting power of the infrared ray emitter 22, so that the iris camera 10 acquires iris information of a user.

The above-mentioned control method can be executed by the electronic device 100. Specifically, the electronic device 100 includes the iris camera 10 and the proximity sensor 20. The proximity sensor 20 includes the infrared ray emitter 22 and the infrared ray receiver 24. The infrared ray emitter 22 can be used for executing the block S1, the infrared ray receiver 24 can be used for executing the block S2, and the iris camera 10 can be used for executing the block S3.

That is, the infrared ray emitter 22 emits the proximity infrared ray for detecting the proximity state. The infrared ray receiver 24 receives the proximity infrared ray reflected from the external object. Upon the reception of the reflected proximity infrared ray by the infrared ray receiver 24, the infrared ray emitter 22 changes the transmitting power, so that the iris camera 10 acquires iris information of the user.

When the infrared ray emitter 22 changes the transmitting power, the infrared ray emitter 22 is used for emitting iris-recognition infrared ray, so that the iris camera 10 acquires iris information of the user. The power of the infrared ray emitter 22 when emitting the proximity infrared ray is different from the power of the infrared ray emitter 22 when emitting the iris-recognition infrared ray.

The electronic device 100 includes any one of mobile phones, tablet PCs, laptops, smart watches, smart bands, smart glasses and smart helmets, or may also be an integrated module including the iris camera 10 and the proximity sensor 20. The integrated module is used for being mounted in the mobile phones, tablet PCs, laptops, smart watches, smart bands, smart glasses or smart helmets. In a specific embodiment of the present disclosure, the electronic device 100 is a mobile phone.

Figure 4:
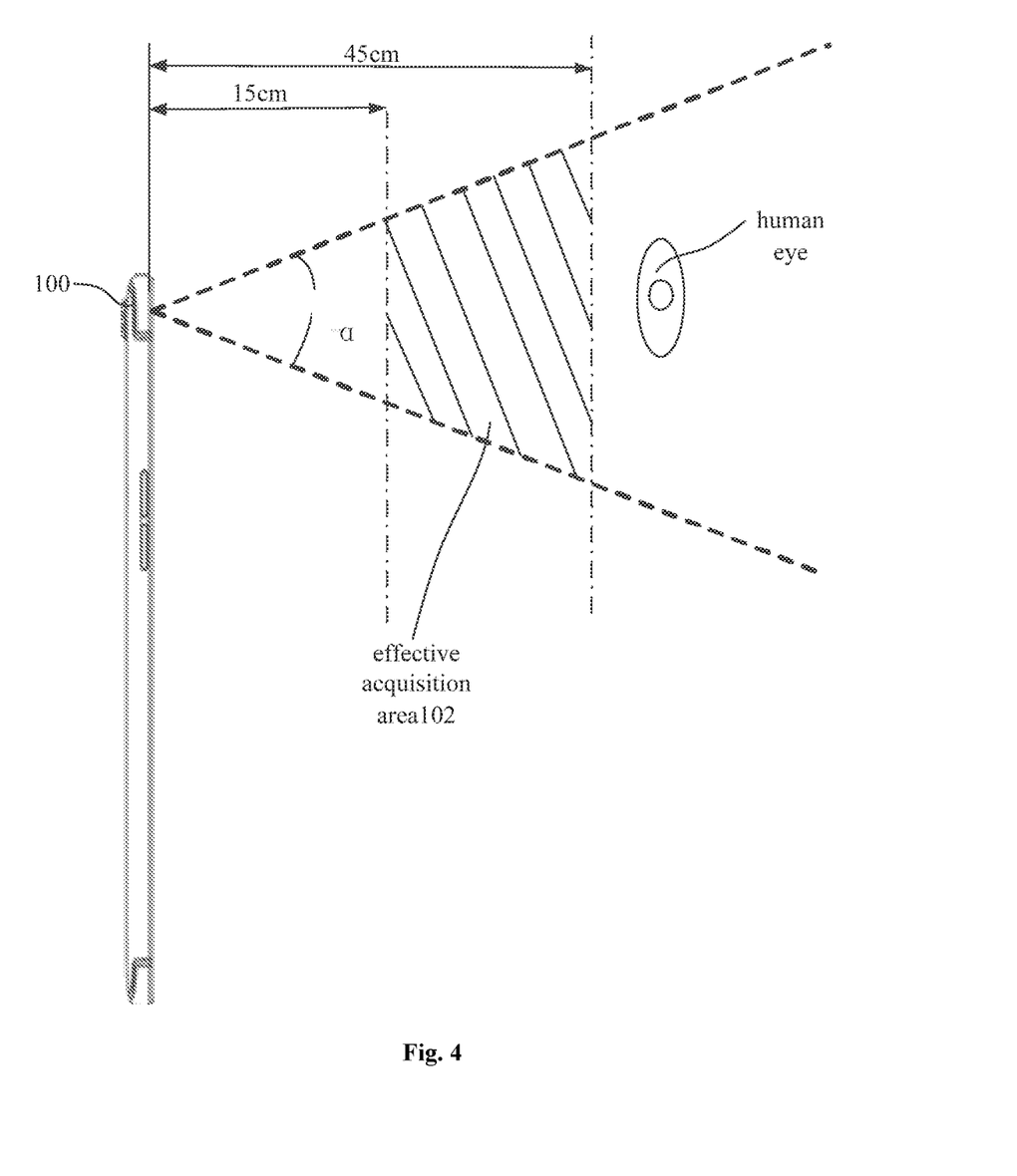
FIG. 4 is a schematic diagram of iris acquisition principle of an electronic device according to some embodiments of the present disclosure.

Referring to FIG. 4, when the infrared ray emitter 22 assists the iris camera 10 with work, the infrared ray emitter 22 emits the iris-recognition infrared ray at an angle $\alpha$. The iris camera 10 can acquire an iris image of the external object (human eye is taken as an example to be explained herein), and the iris image is an effective iris image. A ray area where the iris camera 10 can acquire the effective iris images is defined as an effective acquisition area 102, for example, an area covered by the iris-recognition infrared ray at a distance of 15-45 cm from the iris camera 10. In which, the effective iris image means that, (1) the iris image is a clear enough image, the clear iris image is beneficial to a subsequent extraction of characteristic information of the iris; (2) an iris part in the iris image is complete, the complete iris image is the premise of acquiring a complete iris characteristic information; (3) a ratio of a pixel of the iris part in the iris image to all pixels of the whole iris image is large enough, the comparatively large ratio is beneficial to the extraction of the characteristic information of the iris. The iris image is considered as the effective iris image if and only if the iris image satisfies the above three conditions at the same time. If one condition is not satisfied, the iris image is not considered as the effective iris image. If the iris image is detected not to be the effective iris image, it is possible that a complete iris is not acquired, or the iris part in the acquired iris image has a small proportion.

The effective acquisition area 102 of the iris camera 10 can completely cover a detection range where the infrared ray receiver 24 can receive the proximity infrared ray reflected from the external object.

Figure 5:
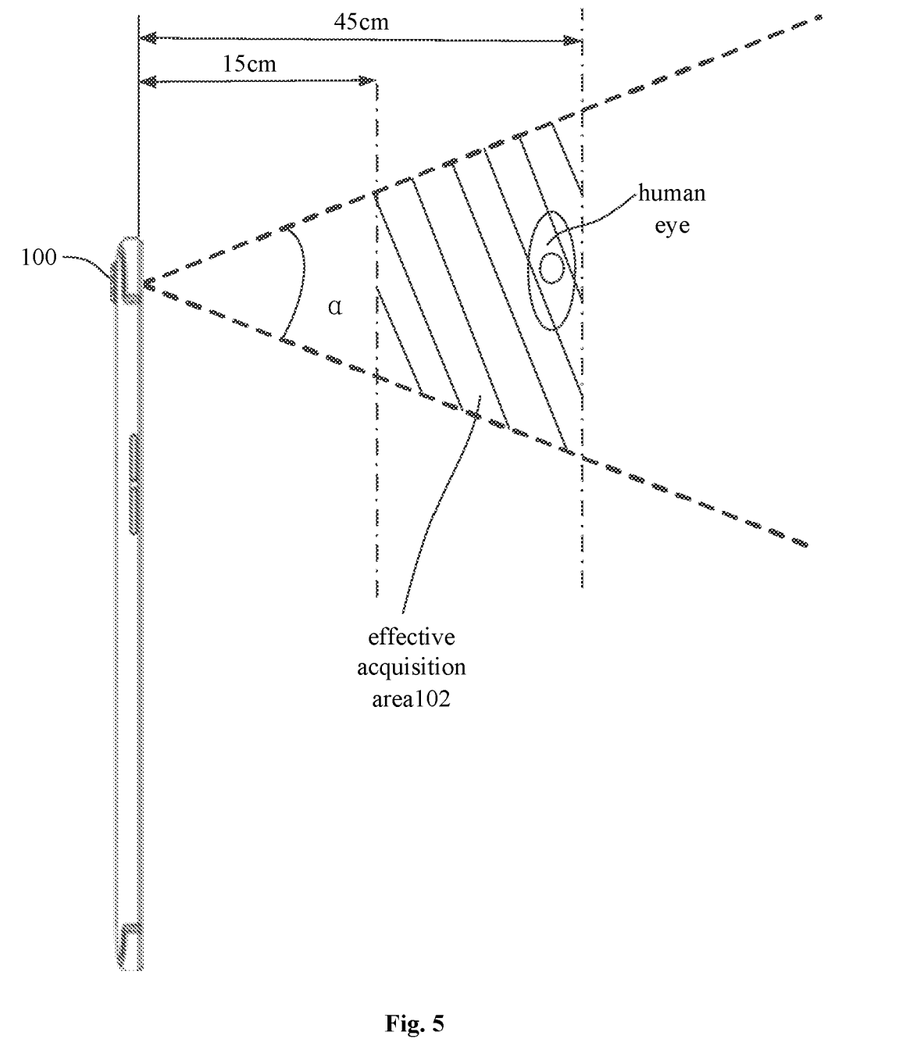
FIG. 5 is a schematic diagram of iris acquisition principle of an electronic device according to some embodiments of the present disclosure.

That is, whether the external object exists in the effective acquisition area 102 of the iris camera 10 can be determined according to the fact that whether the infrared ray receiver 24 receives the proximity infrared ray reflected from the external object. When the infrared ray receiver 24 does not receive the proximity infrared ray reflected from the external object, the external object does not exist in the effective acquisition area 102 of the iris camera 10 (as illustrated in FIG. 4); when the infrared ray receiver 24 receives the proximity infrared ray reflected from the external object, the external object exists in the effective acquisition area 102 of the iris camera 10 (as illustrated in FIG. 5). The external object can be an object which can reflect the proximity infrared ray, and the object includes any parts of human body, iris, iris template, and etc.

Generally, whether the external object exists in the effective acquisition area 102 can be determined just by detecting whether the proximity infrared ray is reflected back by means of the infrared ray receiver 24, however texture and various details of the iris are needed to be acquired by means of the iris camera 10 so as to accomplish the final iris recognition, therefore, a concentration degree of the iris-recognition infrared ray emitted by the infrared ray emitter 22 is far higher than that of the proximity infrared ray emitted by the infrared ray emitter 22, that is, the power of the infrared ray emitter 22 when emitting the iris-recognition infrared ray is generally larger than the power of the infrared ray emitter 22 when emitting the proximity infrared ray. When the iris camera 10 acquires the iris image of the external object, the electronic device 100 also needs to perform operations on the iris image including iris image contrast, conservation and the like, therefore, the power consumption of the electronic device 100 when the infrared ray emitter 22 emits the proximity infrared ray, the infrared ray receiver 24 works and the iris camera 10 does not perform the image acquisition is smaller than the power consumption of the electronic device 100 when the infrared ray receiver 24 does not work, the infrared ray emitter 22 emits the iris-recognition infrared ray, and the iris camera 10 acquires the iris image of the external object.

With the electronic device 100 and iris acquisition method according to embodiments of the present disclosure, the infrared ray emitter 22 is controlled to emit the proximity infrared ray, the infrared ray receiver 24 is controlled to work and the iris camera 10 is controlled not to perform the image acquisition when the external object does not exist in the effective acquisition area 102 of the iris camera 10; when the external object exists in the effective acquisition area 102 of the iris camera 10, the infrared ray receiver 24 is controlled not to work, the infrared ray emitter 22 is controlled to emit the iris-recognition infrared ray, and the iris camera 10 is controlled to acquire the iris image of the external object, so as to avoid the iris camera 10 from always acquiring the iris image of the external object (including the cases in which the external object does not exist in the effective acquisition area 102 of the iris camera 10 and the external object exists in the effective acquisition area 102 of the iris camera 10), thereby reducing the power consumption of the electronic device 100.

In some embodiments, when the infrared ray receiver 24 receives the reflected proximity infrared ray, the infrared ray emitter 22 increases the transmitting power, so that the iris camera 10 acquires the iris information of the user. That is, the power of the infrared ray emitter 22 when emitting the iris-recognition infrared ray is larger than the power of the infrared ray emitter 22 when emitting the proximity infrared ray.

Whether the external object exists in the effective acquisition area 102 can be determined just by detecting whether the proximity infrared ray is reflected back by means of the infrared ray receiver 24, however texture and various details of the iris are needed to be acquired by means of the iris camera 10 so as to accomplish the final iris recognition, therefore, the concentration degree of the iris-recognition infrared ray emitted by the infrared ray emitter 22 is far higher than that of the proximity infrared ray emitted by the infrared ray emitter 22. The power of the infrared ray emitter 22 when emitting the iris-recognition infrared ray is larger than the power of the infrared ray emitter 22 when emitting the proximity infrared ray, enabling the intensity of the iris-recognition infrared ray emitted by the infrared ray emitter 22 to be comparatively high, such that the iris camera 10 can acquire the iris image of higher definition.

In some embodiments, when the infrared ray receiver 24 receives the reflected proximity infrared ray, the infrared ray emitter 22 decreases the transmitting power, so that the iris camera 10 acquires the iris information of the user.

Specifically, when the external object (human eye is taken as an example to be explained herein) exists in the effective acquisition area 102 of the iris camera 10, on the premise that the iris-recognition infrared ray emitted by the infrared ray emitter 22 can be acquired by the iris camera 10 after being reflected from the external object and the iris information is acquired, the power of the infrared ray emitter 22 when emitting the iris-recognition infrared ray can be smaller than the power of the infrared ray emitter 22 when emitting the proximity infrared ray.

When the power of the infrared ray emitter 22 when emitting the proximity infrared ray is larger than the power of the infrared ray emitter 22 when emitting the iris-recognition infrared ray, it is possible to enable the intensity of the proximity infrared ray emitted by the infrared ray emitter 22 to be comparatively high, thereby improving the accuracy of determining whether the external object exists in the effective acquisition area 102 by means of the infrared ray receiver 24.

In some embodiments, the infrared ray emitter 22 in the above embodiments emits the proximity infrared ray at a first power, the infrared ray emitter 22 emits the iris-recognition infrared ray at a second power, and the first power is smaller than the second power.

The electronic device 100 in the present embodiment avoids the infrared ray emitter 22 from always (including the cases in which the external object does not exist in the effective acquisition area 102 of the iris camera 10 and the external object exists in the effective acquisition area 102 of the iris camera 10) emitting the iris-recognition infrared ray at the second power, thereby further reducing the power consumption of the electronic device 100.

Figure 2:
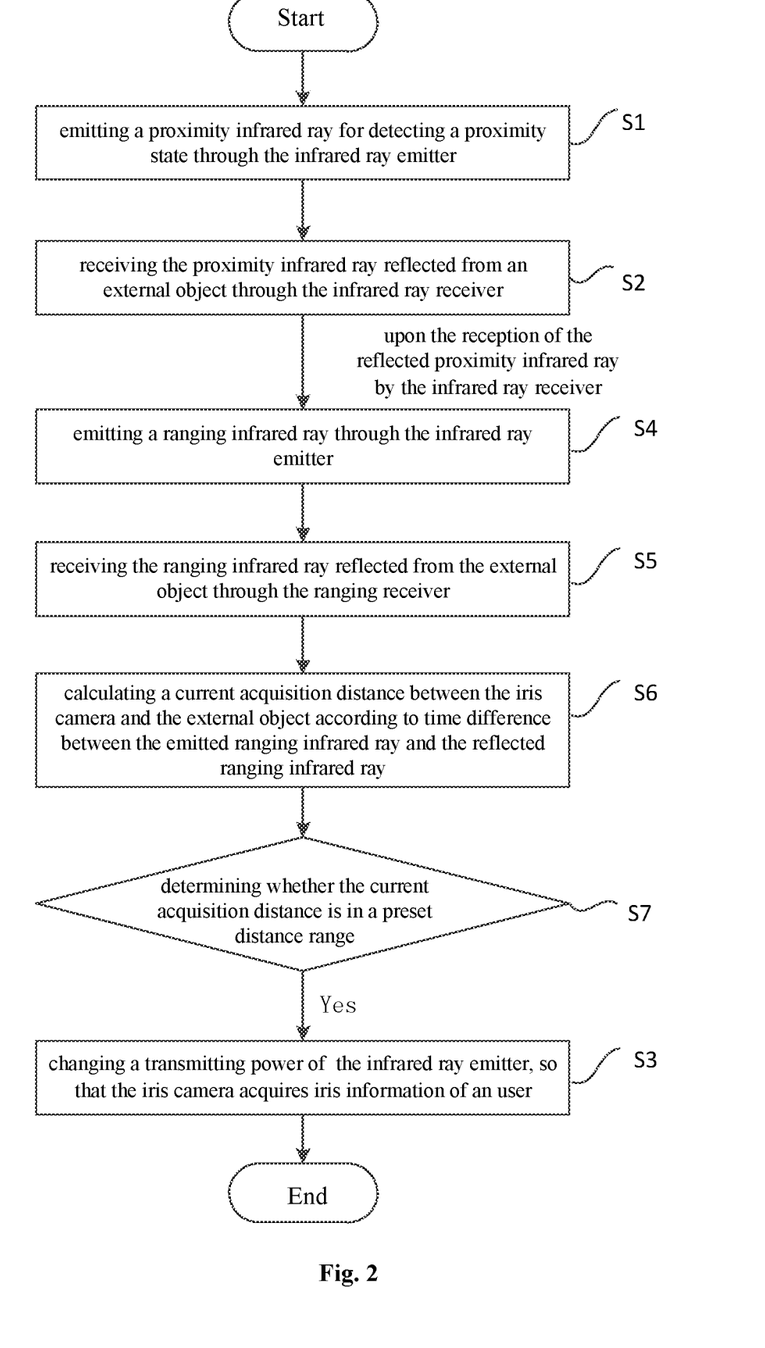
FIG. 2 is a flow chart of an iris acquisition method according to some embodiments of the present disclosure.

Referring to FIGS. 2 and 3, in some embodiments, the electronic device 100 also includes a ranging receiver 40 independently of the iris camera 10 and the infrared ray receiver 24. After the infrared ray receiver 24 receives the reflected proximity infrared ray, and before the infrared ray emitter 22 changes the transmitting power (after the block S2, and before the block S3), the iris acquisition method further includes:

S4: emitting a ranging infrared ray by the infrared ray emitter 22;

S5: receiving the ranging infrared ray reflected from the external object by the ranging receiver 40;

S6: calculating a current acquisition distance between the iris camera 10 and the external object according to a time difference between emitting of the ranging infrared ray and receiving of the reflected ranging infrared ray;

S7: determining whether the current acquisition distance is in a preset distance range; and when the current acquisition distance is in the preset range, then entering the block of changing the transmitting power of the infrared ray emitter 22 so that the iris camera 10 acquires iris information of the user (entering the block S3).

The above-mentioned iris acquisition method can also be executed by the electronic device 100. Specifically, in some embodiments, the electronic device 100 also includes the ranging receiver 40 independently of the iris camera 10 and the infrared ray receiver 24. The infrared ray emitter 22 is used for executing the block S4, the ranging receiver 40 is used for executing the block S5, and a processor 30 is used for executing the block S6 and the block S7. That is, the infrared ray emitter 22 is used for emitting the ranging infrared ray. The ranging receiver 40 is used for receiving the ranging infrared ray reflected from the external object. The processor 30 is used for calculating the current acquisition distance between the iris camera 10 and the external object according to the time difference between emitting of the ranging infrared ray and receiving of the reflected ranging infrared ray and determining whether the current acquisition distance is in the preset distance range. When the current acquisition distance is in the preset range, the infrared ray emitter 22 changes the transmitting power, so that the iris camera 10 acquires iris information of the user.

Figure 6:
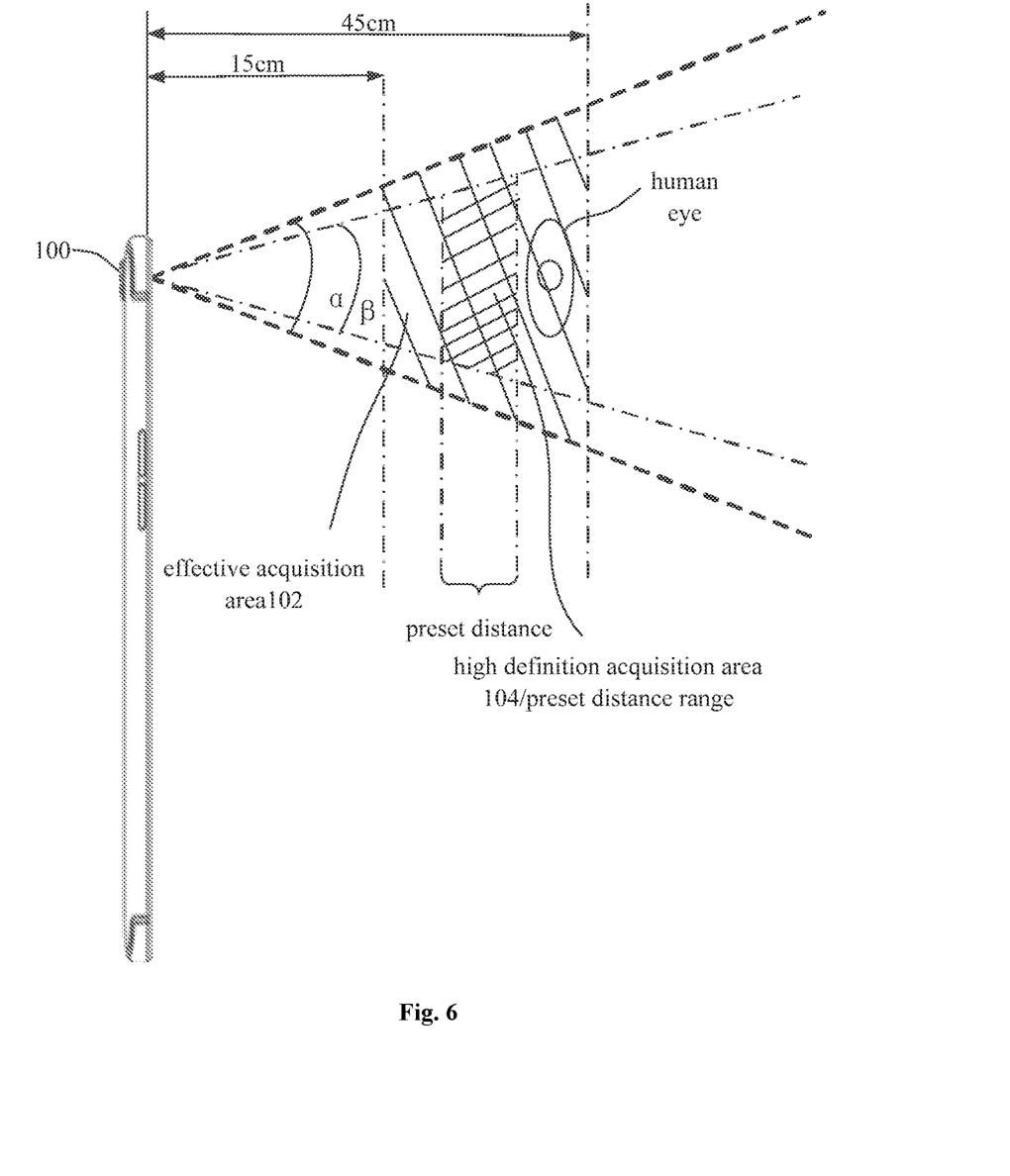
FIG. 6 is a schematic diagram of iris acquisition principle of an electronic device according to some embodiments of the present disclosure.

Referring to FIG. 6, the infrared ray emitter 22 and the ranging receiver 40 operate cooperatively to constitute a ranging sensor. When the ranging sensor works, the infrared ray emitter 22 emits the ranging infrared ray at an angle β, and β<α. The preset distance range is a range (hereinafter called a high definition acquisition area 104 of the iris camera 10) where the iris camera 10 can acquire the iris image of the external object more accurately. That is, the definition of the iris image of the external object acquired by the iris camera 10 when the distance between the external object and the iris camera 10 is in the preset distance range is higher than the definition of the iris image of the external object acquired by the iris camera 10 when the distance between the external object and the iris camera 10 is not in the preset distance range. In other words, the definition of the iris image of the external object acquired by the iris camera 10 when the external object is located in the high definition acquisition area 104 is higher than the definition of the iris image of the external object acquired by the iris camera 10 when the external object is located out of the high definition acquisition area 104.

Figure 7:
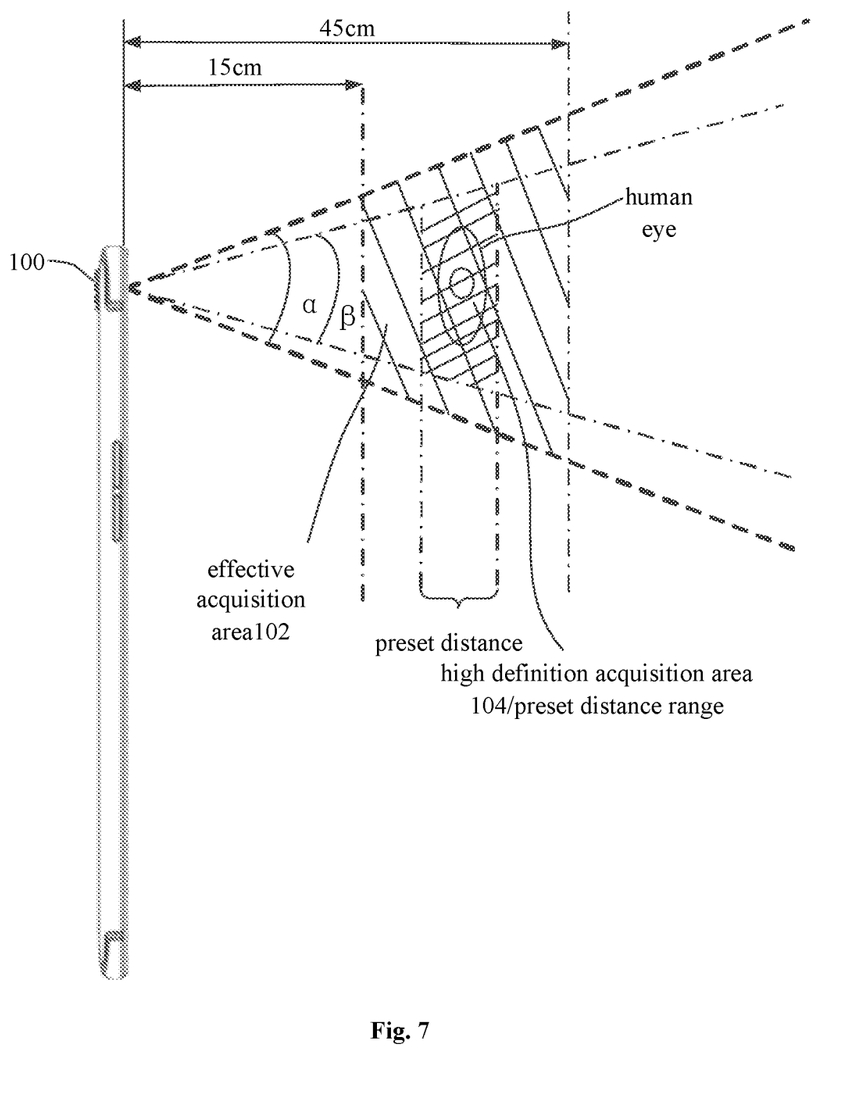
FIG. 7 is a schematic diagram of iris acquisition principle of an electronic device according to some embodiments of the present disclosure.

Specifically, the effective acquisition area 102 completely covers the high definition acquisition area 104, and the angle of the effective acquisition area 102 is larger than or equal to the angle of the high definition acquisition area 104. The angle α of the proximity infrared ray emitted by the infrared ray emitter 22 is larger than or equal to the angle β of the ranging infrared ray emitted by the infrared ray emitter 22. Generally, the intensity of the received infrared ray when the external object is located in the high definition acquisition area 104 (as illustrated in FIG. 7) is higher than the intensity of the received infrared ray when the external object is located in a rest area (as illustrated in FIG. 6) of the effective acquisition area 102 apart from the high definition acquisition area 104. Therefore, the acquired iris image when the external object is located in the high definition acquisition area 104 (as illustrated in FIG. 7) is clearer than the acquired iris image when the external object is located in the rest area (as illustrated in FIG. 6) of the effective acquisition area 102 apart from the high definition acquisition area 104. Generally, since the angle β of the ranging infrared ray emitted by the infrared ray emitter 22 is smaller than the angle α of the iris-recognition infrared ray, the power of the infrared ray emitter 22 when operating cooperatively with the ranging receiver 40 is far smaller than the power of the infrared ray emitter 22 when operating as a part of the iris camera 10. Therefore, the power consumption when the infrared ray emitter 22 and the ranging receiver 40 operate cooperatively (to constitute the ranging sensor together) is smaller than the power consumption when the iris camera 10 acquires the iris image. In addition, the electronic device 100 also needs to perform operations on the iris image including iris image contrast, conservation and the like when the iris camera 10 acquires the iris image, thus, the power consumption of the electronic device 100 when the ranging receiver 40 works and the iris camera 10 does not perform the image acquisition is smaller than the power consumption of the electronic device 100 when the ranging receiver 40 does not work and the iris camera 10 acquires the iris image of the external object.

In the iris recognition method according to the present embodiment, the blocks S4-S7 are added after the block S2 and before the block S3, such that the iris camera 10 is started to acquire the iris image of the external object when the distance between the external object and the iris camera 10 is in the preset distance range (the external object is located in the high definition acquisition area 104), thereby improving the definition of the iris image and accelerating the acquisition of the iris image of the external object by means of the iris camera 10. The power consumption of the ranging receiver 40 in operation is smaller than the power consumption of the iris camera 10 when acquiring the iris image of the external object, thereby further reducing the power consumption of the electronic device 100. In the meanwhile, the infrared ray emitter 22 of the proximity sensor 20 can serve as a light source of the infrared ray receiver 24 and a light source of the iris camera 10 for acquiring the iris image of the external object, and can also serve as a light source of the ranging receiver 40, thereby saving electronic elements required by the electronic device 100 and cost for the electronic device 100.

In some embodiments, the power of the infrared ray emitter 22 when emitting the ranging infrared ray can be larger than the power of the infrared ray emitter 22 when emitting the proximity infrared ray.

Whether an object to be identified exists in the effective acquisition area 102 can be determined just by detecting whether the proximity infrared ray is reflected back by means of the infrared ray receiver 24, however the ranging sensor 40 needs to steadily receive the ranging infrared ray reflected from the object to be identified, so as to enable the processor 30 to obtain the time difference between emitting of the ranging infrared ray and receiving of the reflected ranging infrared ray, therefore, the concentration degree of the ranging infrared ray emitted by the infrared ray emitter 22 is higher than that of the proximity infrared ray emitted by the infrared ray emitter 22. The power of the infrared ray emitter 22 when emitting the ranging infrared ray is larger than the power of the infrared ray emitter 22 when emitting the proximity infrared ray, such that the processor 30 can obtain the time difference of higher precision.

In some embodiments, the power of the infrared ray emitter 22 when emitting the ranging infrared ray can be smaller than the power of the infrared ray emitter 22 when emitting the proximity infrared ray.

Specifically, when the external object (human eye is taken as an example to be explained herein) is located in the high definition acquisition area 104 of the iris camera 10, on the premise that the ranging infrared ray emitted by the infrared ray emitter 22 can be received by the ranging receiver 40 after being reflected from the external object and the processor 30 is enabled to obtain the time difference between emitting of the ranging infrared ray and receiving of the reflected ranging infrared ray, the power of the infrared ray emitter 22 when emitting the ranging infrared ray can be smaller than the power of the infrared ray emitter 22 when emitting the proximity infrared ray.

When the power of the infrared ray emitter 22 when emitting the proximity infrared ray is larger than the power of the infrared ray emitter 22 when emitting the ranging infrared ray, it is possible to enable the intensity of the proximity infrared ray emitted by the infrared ray emitter 22 to be comparatively high, thereby improving the accuracy of determining whether the external object exists in the effective acquisition area 102 by means of the infrared ray receiver 24.

In some embodiment, the infrared ray emitter 22 emits the proximity infrared ray at the first power, the infrared ray emitter 22 emits the ranging infrared ray at the second power, the infrared ray emitter 22 emits the infrared ray at a third power so that the iris camera 10 acquires the iris information of the user. That is, the infrared ray emitter 22 emits the iris-recognition infrared ray at the third power, and the second power is larger than the first power and is smaller than the third power.

The electronic device 100 of the present embodiment avoids the infrared ray emitter 22 from always emitting the iris-recognition infrared ray at the third power (includes the cases in which the external object does not exist in the effective acquisition area 102 of the iris camera 10, the external object exists in the effective acquisition area 102, but not in the high definition acquisition area 104 of the iris camera 10, and the external object exists in the high definition acquisition area 104 of the iris camera 10), thereby further reducing the power consumption of the electronic device 100.

In some embodiments, the infrared ray emitter 22 emits the proximity infrared ray at the first power, the infrared ray emitter 22 emits the ranging infrared ray at the second power, and the infrared ray emitter 22 emits the iris-recognition infrared ray at the third power, the second power is larger than the first power and is smaller than the third power. Current range corresponding to the first power is 50 mA-150 mA, for example, any one of 50 mA, 60 mA, 70 mA, 80 mA, 90 mA, 100 mA, 110 mA, 120 mA, 130 mA, 140 mA, and 150 mA can be chosen as the current corresponding to the first power. The current range corresponding to the second power is 100 mA-200 mA, for example, any one of 100 mA, 110 mA, 120 mA, 130 mA, 140 mA, 150 mA, 160 mA, 170 mA, 180 mA, 190 mA and 200 mA can be chosen as the current corresponding to the second power. The current range corresponding to the third power is 300-500 mA, for example, any one of 300 mA, 320 mA, 340 mA, 360 mA, 380 mA, 400 mA, 420 mA, 440 mA, 460 mA, 480 mA and 500 mA can be chosen as the current corresponding to the third power. For example, the current corresponding to the first power can be 50 mA, correspondingly, the current corresponding to the second power can be 100 mA, the current corresponding to the third power can be 300 mA, as long as the first power is smaller than the second power and the second power is smaller than the third power.

In some embodiment, an operation mode of the electronic device 100 includes a first working mode, a second working mode and a third working mode. When the electronic device 100 operates in the first working mode, the infrared ray emitter 22 emits the proximity infrared ray at the first power, and the infrared ray receiver 24 works. When the electronic device 100 operates in the second working mode, the infrared ray emitter 22 emits the ranging infrared ray at the second power, and the ranging receiver 40 works. When the electronic device 100 operates in the third working mode, the infrared ray emitter 22 emits the iris-recognition infrared ray at the third power, and the iris camera 10 acquires the iris image of the external object.

The power consumption of the electronic device 100 when operating in the second working mode is larger than the power consumption of the electronic device 100 when operating in the first working mode, and the power consumption of the electronic device 100 when operating in the second working mode is smaller than the power consumption of the electronic device 100 when operating in the third working mode. The power consumption of the electronic device 100 operating in the first working mode, the second working mode and the third working mode successively under control of the iris acquisition method is smaller than the power consumption of the electronic device 100 always operating in the third working mode.

In some embodiments, the electronic device 100 further includes a visible light camera 50, the iris camera 10 can assist the visible light camera 50 with photograph. For example, based on the iris camera 10 and the visible light camera 50, a binocular stereo vision ranging method can be used to acquire a depth image. There is a certain distance between the iris camera 10 and the visible light camera 50, and the depth information of an object to be photographed can be calculated according to a parallax between images acquired by the two cameras. For another example, under the condition of low illumination, the iris camera 10 can assist the visible light camera 50 with photograph to acquire clear image.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in a specific example," or "in some examples," in various places throughout this specification are not necessarily referring to the same embodiment or example of the present disclosure. Moreover, the particular features, structures, materials, or characteristics may be combined in any suitable manner in one or more embodiments or examples. Furthermore, without mutual contradiction, those skilled in the art can combine different embodiments or examples and features of different embodiments or examples described in the specification.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

Any process or method described in a flow chart or described herein in other ways may be understood to include one or more modules, segments or portions of codes of executable instructions for achieving specific logical functions or blocks in the process, and the scope of a preferred embodiment of the present disclosure includes other implementations, which should be understood by those skilled in the art.

The logic and/or blocks described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of blocks or methods may be realized by the software or firmware stored in the memory and executed by the appropriate instruction execution system. For example, if it is realized by the hardware, likewise in another embodiment, the blocks or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the blocks in the above exemplifying method of the present disclosure may be achieved by commanding the related hardware with programs. The programs may be stored in a computer readable storage medium, and the programs comprise one or a combination of the blocks in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments are exemplary and cannot be construed to limit the present disclosure, and changes, alternatives, and modifications can be made in the embodiments within the scope of the present disclosure.

What is claimed is:

1. A method for an electronic device acquiring an iris, comprising:
    emitting a proximity infrared ray for detecting a proximity state by an infrared ray emitter, the electronic device comprising:
        an iris camera,
        a proximity sensor, the proximity sensor comprising the infrared ray emitter and an infrared ray receiver, and
        a ranging receiver independent of the iris camera and the infrared ray receiver;
    receiving the proximity infrared ray reflected from an external object by the infrared ray receiver; and
    upon the reception of the reflected proximity infrared ray by the infrared ray receiver, the infrared ray emitter emitting an iris-recognition infrared ray with a transmitting power different from a transmitting power of the proximity infrared ray, to assist the iris camera in acquiring iris information of a user;
    wherein, after the infrared ray receiver receives the reflected proximity infrared ray, the iris acquisition method further comprises:
    emitting a ranging infrared ray by the infrared ray emitter;
    receiving the ranging infrared ray, reflected from the external object, by the ranging receiver;
    calculating a current acquisition distance between the iris camera and the external object according to a time difference between emitting of the ranging infrared ray and receiving of the reflected ranging infrared ray;
    determining whether the current acquisition distance is in a preset distance range; and
    when the current acquisition distance is in the preset range, changing the transmitting power of the infrared ray emitter so that the iris camera acquires iris information of the user,
    wherein the infrared ray emitter emits the proximity infrared ray at a first power, the infrared ray emitter emits the ranging infrared ray at a second power, the infrared ray emitter emits an iris-recognition infrared ray at a third power so that the iris camera acquires the iris information of the user, and the second power is larger than the first power and is smaller than the third power.

2. The method according to claim 1, wherein an area covered by an iris-recognition infrared ray at a distance of 15-45 cm from the iris camera is defined as an effective acquisition area, the iris-recognition infrared ray is emitted by the infrared ray emitter, and the iris camera acquires an effective iris image of the external object when the external object is in the effective acquisition area.

3. The method according to claim 2, wherein the effective acquisition area of the iris camera completely covers a detection range where the infrared ray receiver can receive the proximity infrared ray reflected from the external object.

4. The method according to claim 1, wherein a current range corresponding to the first power is 50 mA-150 mA, a current range corresponding to the second power is 100 mA-200 mA, and a current range corresponding to the third power is 300-500 mA.

5. The method according to claim 4, wherein the current corresponding to the first power is 50 mA, the current corresponding to the second power is 100 mA, and the current corresponding to the third power is 300 mA.

6. An electronic device, comprising:
   an iris camera for acquiring iris information;
   a proximity sensor for detecting a proximity state between an external object and the electronic device, the proximity sensor comprising an infrared ray emitter and an infrared ray receiver, the infrared ray emitter emitting a proximity infrared ray for detecting the proximity state and emitting an iris-recognition infrared ray, the infrared ray receiver being used for receiving the proximity infrared ray reflected from the external object;
   a processor; and,
   a ranging receiver independent of the iris camera and the infrared receiver;
   wherein:
      upon the reception of the reflected proximity infrared ray for detecting the proximity state by the infrared ray receiver, the infrared ray emitter emits the iris-recognition infrared ray with a transmitting power different from a transmitting power of the proximity infrared ray to assist the iris camera in acquiring iris information of a user;
      after the infrared ray receiver receives the reflected proximity infrared ray, the infrared ray emitter is also used for emitting a ranging infrared ray;
      the ranging receiver is used for receiving the ranging infrared ray reflected from the external object;
      the processor is used for calculating a current acquisition distance between the iris camera and the external object according to a time difference between emitting of the ranging infrared ray and receiving of the reflected ranging infrared ray and determining whether the current acquisition distance is in the preset distance range;
      when the current acquisition distance is in the preset range, the infrared ray emitter changes the transmitting power, so that the iris camera acquires iris information of the user; and
   wherein the infrared ray emitter emits the proximity infrared ray at a first power, the infrared ray emitter emits the ranging infrared ray at a second power, the infrared ray emitter emits an iris-recognition infrared ray at a third power so that the iris camera acquires the iris information of the user, and the second power is larger than the first power and is smaller than the third power.

7. The electronic device according to claim 6, wherein the electronic device further comprises a visible light camera, the iris camera and the visible light camera are separately positioned.

8. The electronic device according to claim 6, wherein the electronic device is a mobile phone.

9. The method according to claim 6, wherein an area covered by an iris-recognition infrared ray at a distance of 15-45 cm from the iris camera is defined as an effective acquisition area, the iris-recognition infrared ray is emitted by the infrared ray emitter, and the iris camera acquires an effective iris image of the external object when the external object is in the effective acquisition area.

10. The method according to claim 9, wherein the effective acquisition area of the iris camera completely covers a detection range where the infrared ray receiver can receive the proximity infrared ray reflected from the external object.

11. The method according to claim 6, wherein a current range corresponding to the first power is 50 mA-150 mA, a current range corresponding to the second power is 100 mA-200 mA, and a current range corresponding to the third power is 300-500 mA.

12. The method according to claim 11, wherein the current corresponding to the first power is 50 mA, the current corresponding to the second power is 100 mA, and the current corresponding to the third power is 300 mA.

13. A method for an electronic device acquiring an iris, comprising:
   emitting a proximity infrared ray at a first power for detecting a proximity state by one infrared ray emitter, the electronic device comprising an iris camera and a proximity sensor, the proximity sensor comprising the one infrared ray emitter and an infrared ray receiver;
   receiving the proximity infrared ray reflected from an external object by the infrared ray receiver;
   upon the reception of the reflected proximity infrared ray by the infrared ray receiver, emitting a ranging infrared ray at a second power greater than the first power by the infrared ray emitter;
   receiving the ranging infrared ray reflected from the external object by a ranging receiver;
   calculating a current acquisition distance between the iris camera and the external object according to a time difference between emitting of the ranging infrared ray and receiving of the reflected ranging infrared ray;
   determining whether the current acquisition distance is in a preset distance range; and
   when the current acquisition distance is in the preset range, then the infrared ray emitter emitting an iris-recognition infrared ray at a third power greater than the second power to assist the iris camera in acquiring iris information of a user.

14. The method according to claim 13, wherein an area covered by an iris-recognition infrared ray at a distance of 15-45 cm from the iris camera is defined as an effective acquisition area, the iris-recognition infrared ray is emitted by the infrared ray emitter, and the iris camera acquires an effective iris image of the external object when the external object is in the effective acquisition area.

15. The method according to claim 14, wherein the effective acquisition area of the iris camera completely covers a detection range where the infrared ray receiver can receive the proximity infrared ray reflected from the external object.

16. The method according to claim 13, wherein a current range corresponding to the first power is 50 mA-150 mA, a current range corresponding to the second power is 100 mA-200 mA, and a current range corresponding to the third power is 300-500 mA.

17. The method according to claim 16, wherein the current corresponding to the first power is 50 mA, the current corresponding to the second power is 100 mA, and the current corresponding to the third power is 300 mA.

* * * * *